(12) United States Patent
Nurminen et al.

(10) Patent No.: US 11,663,281 B2
(45) Date of Patent: May 30, 2023

(54) CONTEXT INFORMATION FROM CROWD-SOURCED DATA

(71) Applicant: HERE Global B.V., Eindhoven (NL)

(72) Inventors: Henri Jaakko Julius Nurminen, Tampere (FI); Pavel Ivanov, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 68 days.

(21) Appl. No.: 16/905,639

(22) Filed: Jun. 18, 2020

(65) Prior Publication Data

US 2020/0401641 A1 Dec. 24, 2020

(30) Foreign Application Priority Data

Jun. 21, 2019 (EP) ..................................... 19181769

(51) Int. Cl.
*G06F 16/00* (2019.01)
*G06F 16/9536* (2019.01)
(Continued)

(52) U.S. Cl.
CPC ......... *G06F 16/9536* (2019.01); *G06N 20/00* (2019.01); *H04W 4/029* (2018.02)

(58) Field of Classification Search
CPC ... G06F 16/9536; G06N 20/00; H04W 4/029; H04W 4/80; H04W 4/02; H04W 52/0254;
(Continued)

(56) References Cited

U.S. PATENT DOCUMENTS 8,688,396 B2 4/2014 Lin et al.
9,087,213 B2 7/2015 Skaaksrud et al.
(Continued)

FOREIGN PATENT DOCUMENTS

EP 2 936 893 B1 10/2015

OTHER PUBLICATIONS

Xi Liu, Yiju Zhan, and Jian Cen, "An Energy-Efficient Crowd-Sourcing-Based Indoor Automatic Localization System", Jul. 15, 2018, IEEE, pp. 6009-6022 (Year: 2018).*
(Continued)

*Primary Examiner* — Jared M Bibbee
(74) *Attorney, Agent, or Firm* — Alston & Bird LLP

(57) ABSTRACT

A method is provided that includes obtaining one or more pieces of crowd-sourced information. A respective crowd-sourced information is at least indicative of a location at which the respective crowd-sourced information was gathered. The method determines a set of tiles at least partially based on the one or more geographical areas. For at least one tile, the method obtains one or more pieces of fingerprint information comprised by the one or more pieces of crowd-sourced information that were gathered within the respective area of the respective tile and determines an area type and/or context information indicative of a type of venue located within the respective tile and/or context the respective area of the respective tile is used for. The area type and/or context information is determined at least partially based on the one or more pieces of fingerprint information. A corresponding apparatus and computer program product are also provided.

20 Claims, 5 Drawing Sheets

(51) Int. Cl.
*H04W 4/029* (2018.01)
*G06N 20/00* (2019.01)

(58) Field of Classification Search
CPC ... H04W 16/18; H04W 64/00; G01S 5/02524; G01S 5/02525; G01S 5/02521; G01S 5/02522; Y02D 30/70
See application file for complete search history.

(56) References Cited

U.S. PATENT DOCUMENTS

| | | | | |
|---|---|---|---|---|
| 9,503,858 | B2* | 11/2016 | Palanki | G01S 5/0252 |
| 9,571,972 | B2 | 2/2017 | Lection et al. | |
| 9,609,539 | B2* | 3/2017 | Edge | G01S 5/0036 |
| 9,609,620 | B1 | 3/2017 | Bitia et al. | |
| 11,025,979 | B2* | 6/2021 | Sharp | H04N 21/4394 |
| 2010/0094930 | A1 | 4/2010 | Griff et al. | |
| 2014/0141803 | A1* | 5/2014 | Marti | H04W 4/029 |
| | | | | 455/456.2 |
| 2016/0007209 | A1 | 1/2016 | Hohs et al. | |
| 2016/0066151 | A1* | 3/2016 | Palanki | H04L 67/10 |
| | | | | 455/456.1 |
| 2016/0072900 | A1* | 3/2016 | Rahman | H04L 67/16 |
| | | | | 709/213 |
| 2016/0205238 | A1* | 7/2016 | Abramson | G01C 21/3484 |
| | | | | 455/456.4 |
| 2017/0031996 | A1* | 2/2017 | Priness | G06F 16/24575 |
| 2017/0060858 | A1* | 3/2017 | Sharp | H04N 21/658 |
| 2017/0279957 | A1* | 9/2017 | Abramson et al. | H04M 1/6075 |
| 2018/0007099 | A1* | 1/2018 | Ein-Gil | H04L 67/16 |
| 2018/0120410 | A1 | 5/2018 | Ivanov et al. | |

OTHER PUBLICATIONS

Florian, A. et al. *Location-Based Crowdsourcing: Extending Crowdsourcing to the Real World*, Proceedings of the 6th Nordic Conference on Human-Computer Interaction Extending Boundaries, NordiCHI'10 (Oct. 2010), pp. 13-22.

Peng, Z. et al. *A Node Selection Paradigm for Crowdsourcing Service Based on Region Feature in Crowd Sensing*, [online] [retrieved Mar. 11, 2019]. Retrieved via the Internet: https://www.hindawi.com/journals/mpe/2018/6434083/Mathematical Problems in Engineering, vol. 2018 (Nov. 14, 2018) 11 pages.

Extended European Search Report for Application No. 19181769.1 dated Sep. 3, 2019, 18 pages.

Office Action for European Application No. 19181769.1 dated Dec. 19, 2022, 9 pages.

* cited by examiner

CONTEXT INFORMATION FROM CROWD-SOURCED DATA

CROSS-REFERENCE TO RELATED APPLICATIONS

This application claims priority to European Application No. 19181769.1, filed Jun. 21, 2019, the entire contents of which are incorporated herein by reference.

FIELD OF THE INVENTION

The following disclosure relates to the field of positioning, or more particularly relates to systems, apparatuses, and methods for determining context information from crowd-sourced data.

BACKGROUND

Modern global cellular (GSM (Global System for Mobile Communications), CDMA (Code Division Multiple Access), WCDMA (Wideband CDMA), TD-SCMA (Time Division Synchronous Code Division Multiple Access), LTE (Long Term Evolution), LTE-A (LTE-Advanced), NB-IoT (Narrowband-Internet-of-Things), 5G) and non-cellular (primarily WLAN (Wireless Local Area Network), but also BT (Bluetooth), BLE (BT Low Energy), ZigBee, etc.) positioning technologies are (and will be) based on collecting large global databases containing information on the cellular and non-cellular signals. In near future, the positioning technologies based on the motion sensors will be integrated with cellular/non-cellular positioning for higher availability and responsiveness. A large portion of this data typically originates from the users of these positioning technologies. Collection of data in this way from voluntary users of the service is referred to as crowd-sourcing.

The data from the users is typically in the form of fingerprints, which contain GNSS (Global Navigation Satellite System)-based or WLAN-based location estimate, and the measurements taken from the radio interfaces (cellular, non-cellular). The measurements may contain
- Global and/or local IDs of the cellular network cells observed and, possibly,
  - signal strength and/or pathloss estimates;
  - timing measurements (timing advance or Round-Trip Time);
- BSSIDs (MAC (Media Access Control address) address of the air interface) of the WLAN access points observed and, possibly,
  - SSIDs (Service Set Identifiers);
- signal strengths (received signal strength index, physical Rx level in dBm ref 1 mW, etc.) and/or pathloss estimates;
- timing measurements (Round-Trip Time);
- time stamp;
- speed;
- reference position measurement technology;
- collection device information;
- battery level data;
- environment sensor data;
- or a combination thereof, to name but a few non-limiting examples.

This data gets uploaded to a server or server cloud, where e.g. algorithms may for instance run to generate models of wireless communication nodes for positioning purposes based on the fingerprints (also referred to as fingerprint information) received from the multitude of the users. Such models may be coverage areas, node positions, radio propagation models, Rx fields, etc. In the end, these models are transferred back to the user terminals for use in position determination.

Even when the end user terminal has GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors and in urban canyons, which are generally challenging environments for GNSS-based technologies.

A commercially successful positioning solution needs to be i) globally scalable, ii) have low maintenance and deployment costs, and iii) offer acceptable end-user experience. These requirements are best met by relying on an existing infrastructure (e.g. Wi-Fi) in the buildings and on existing capabilities in the consumer devices. Huge volumes of Wi-Fi measurements data may for instance be harvested via crowd-sourcing through the consumer devices that are equipped with the necessary functionality as a background process, naturally with the end-user consent. However, the technical challenges related to the harvesting, processing, redundancy, ambiguity and storing the crowd-sourced data need to be understood and solved first, before the Wi-Fi radio map may for instance be based on fully crowd-sourced data.

SUMMARY OF SOME EXEMPLARY EMBODIMENTS

There are venues and/or areas that are especially important usage environments for radio network-based positioning and therefore important areas for crowd-sourcing-based data collection. These could include large buildings that are frequently visited by many people who don't know the building well, such as shopping centers, office buildings, hospitals, education buildings, public transport stations, government buildings, public libraries, etc. Another example type of venues could be buildings that are visited rarely but still have important positioning use cases, such as some industry facilities and other functional spaces such as water, waste, or electricity management spaces or storage spaces. Important crowd-sourcing areas can also include facilities of certain businesses/brands/companies. On the other hand, some areas can be low-priority crowd-sourcing areas, such as residential areas, country-side areas, some types of industrial areas, or small-scale business areas, for example.

Crowd-sourcing radio network information from e.g. smartphones is a background process that does not directly benefit the smartphone user. It is thus vital that the crowd-sourcing consumes limited and small amount of resources. These limited resources include energy for scanning e.g. GNSS and WLAN actively, memory for data storage, and energy and network bandwidth for data transmission. Therefore, it is not possible for the crowd-sourcing client to collect data all the time.

Thus, some venues and/or areas can be considered to be more important than others but there is only limited collection quota to be distributed over the visited areas. Thus, the positioning system benefits if it can prioritize data collection, for instance be more prompt to collect in certain areas than in some other areas. For a scalable system, these priorities will in general have to be determined automatically.

Automatic crowd-sourcing prioritization is not a straightforward task, as it may not be known which areas are important crowd-sourcing areas. For example, a geographical map may indicate that there is a healthcare facility or a shop, but it may not be clear whether the facility is a small doctor's practice or a grocery store (e.g. unimportant), or a major hospital or shopping facility (e.g. important). The geographical map might also be unavailable, or it simply might not include all the important venues.

It is thus, inter alia, an object of the invention to enable a solution that can (e.g. at least partially) automatically determine what a certain area is used for, e.g. determining an area type and/or context of the area, and optionally prioritize the respective area to enable crowd-sourcing to take place primarily in prioritized areas, in which (e.g. more and/or up-to-date) crowd-sourced data for positioning purposes is required.

According to a first exemplary aspect of the present invention, a method is disclosed, the method comprising:
- obtaining one or more pieces of crowd-sourced information, wherein a respective crowd-sourced information of the one or more pieces of crowd-sourced information is at least indicative of a location at which the respective crowd-sourced information was gathered;
- determining a set of tiles, wherein the set of tiles is determined at least partially based on the one or more geographical areas, wherein the one or more geographical areas are divided into one or more smaller areas of a pre-defined size, wherein a respective tile of the set of tiles represents a respective smaller area of the one or more smaller areas; and
- for at least one tile of the set of tiles, the method further comprises:
- obtaining one or more pieces of fingerprint information comprised by the one or more pieces of crowd-sourced information, wherein the one or more pieces of fingerprint information were gathered within the respective area of the respective tile; and determining an area type and/or context information indicative of a type of venue located within the respective tile and/or context the respective area of the respective tile is used for, wherein the area type and/or context information is determined at least partially based on the one or more pieces of fingerprint information.

This method may for instance be performed and/or controlled by an apparatus, for instance a server. Alternatively, this method may be performed and/or controlled by more than one apparatus, for instance a server cloud comprising at least two servers. For instance, the method may be performed and/or controlled by using at least one processor of the server or server cloud.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:
- obtaining one or more pieces of priority information and/or one or more tiles of a set of tiles, wherein the one or more tiles of the set of tiles are associated with a respective priority information of the one or more pieces of priority information, wherein the set of tiles is indicative of one or more geographical areas that are divided into one or more smaller areas of a pre-defined size, wherein a respective tile of the set of tiles represents a respective smaller area of the one or more smaller areas; and
- gathering one or more pieces of fingerprint information at least partially based on the obtained one or more pieces of priority information.

This method may for instance be performed and/or controlled by an apparatus, for instance a mobile device, e.g. a mobile terminal, smartphone, tablet, portable navigation device, wearable, IoT (Internet-of-Things) device. For instance, the method may be performed and/or controlled by using at least one processor of the mobile device.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:

an apparatus according to the first exemplary aspect of the present invention as disclosed above, and one or more mobile devices according to the second exemplary aspect of the present invention as disclosed above.

In the following, exemplary features and exemplary embodiments of all aspects of the present invention will be described in further detail.

Example embodiments according to all exemplary aspects of the present invention enable a solution that can define important crowd-sourcing areas. The solution is scalable, and further enables to define important areas in which crowd-sourced data should be obtained (e.g. by associating a higher priority to them than in other areas of reduced importance).

A respective crowd-sourced information of the one or more pieces of crowd-sourced information is at least indicative of a location at which the respective crowd-sourced information was gathered.

Further, the one or more pieces of crowd-sourced information may for instance be indicative of one or more radio network infrastructures located within one or more geographical areas. The one or more pieces of crowd-sourced information may for instance enable to determine one or more location estimates. For instance, one or more (e.g. indoor) radio maps (e.g. for one or more venues) may for instance be determined (e.g. generated) at least partially based on the one or more pieces of crowd-sourced information.

A respective piece of crowd-sourced information of the one or more pieces of crowd-sourced information may also comprise e.g. time stamp, speed, reference position measurement technology, collection device information, battery level data, environment sensor data, or a combination thereof, to name but a few non-limiting examples.

Thus, the minimum requirement may for instance be that a respective crowd-sourced information of the one or more pieces of crowd-sourced information comprises the location where it was gathered so that the respective crowd-sourced information of the one or more pieces of crowd-sourced information may for instance be assigned to the correct tile of the set of tiles.

Such one or more pieces of crowd-sourced information may for instance be gathered (e.g. measured) by one or more mobile devices (e.g. represented by one or more respective mobile devices according to the second exemplary aspect of the present invention).

At least partially based on such a radio map, it may for instance be enabled to determine a position of a respective mobile device. For instance, the mobile device may for instance gather (e.g. measure) a fingerprint information, e.g. indicative of at least one identifier of a radio node observable at a certain location respectively position. Then, it may for instance be compared, which one or more identifiers of radio nodes are observable at the location, e.g. by a comparison of the fingerprint information with information as represented by a radio map. In this way, a location estimate comprising or representing a certain position of a mobile device may for instance be determinable.

Such a mobile device (e.g. the mobile device according to the second exemplary aspect of the present invention) may for instance be portable (e.g. weigh less than 5, 4, 3, 2, or 1 kg). The mobile device may for instance comprise or be connectable to a display for displaying information, e.g. a route that is guided/navigated to a user, to name but one non-limiting example. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS receiver. The mobile device may for instance comprise or be connectable to one or more sensors, e.g. in the form of an accelerometer and/or a gyroscope for gathering (e.g. measuring) further information. The mobile device may for instance comprise or be connectable to a receiver and/or a transmitter (e.g. a transceiver) for receiving and/or sending information.

The one or more pieces of crowd-sourced information may for instance be obtained (e.g. retrieved) from a memory. Such a memory may for instance store the one or more pieces of crowd-sourced information. Such a memory may for instance be a database. Such a memory may for instance be comprised by or connectable to the apparatus performing and/or controlling the method according to the first exemplary aspect of the present invention.

The one or more pieces of crowd-sourced information may for instance be obtained, e.g. by receiving the one or more pieces of crowd-sourced information from an entity that is different from the apparatus performing and/or controlling the method according to the first exemplary aspect of the present invention. Additionally or alternatively, the one or more pieces of crowd-sourced information may for instance be obtained, e.g. by retrieving the one or more pieces of crowd-sourced information, e.g. from one or more third parties respectively their servers, such as e.g. available via the Internet, e.g. a positioning server providing one or more location-based services, to name but one non-limiting example.

The one or more pieces of crowd-sourced information may for instance comprise or represent one or more pieces of fingerprint information. The one or more pieces of crowd-sourced information may for instance comprise or represent additional or further pieces of information, e.g. one or more pieces of fingerprint information and one or more pieces of additional information indicative of one or more attributes and/or features of a radio network infrastructure as comprised by the geographic area. In case the one or more pieces of crowd-sourced information do not comprise or represent such additional pieces of information, the one or more pieces of crowd-sourced information may for instance be equal to one or more pieces of fingerprint information.

The set of tiles may for instance comprise or be represented by one or more tiles. The one or more tiles of the set of tiles may for instance cover the same geographical area as the (complete) set of tiles. The set of tiles may for instance be divided into one or more smaller areas of a pre-defined size (e.g. a size may for instance be a geographical area of 100 m×100 m), to name but one non-limiting example. It will be understood that other sizes of the one or more smaller areas may for instance be definable. The one or more smaller areas may for instance be one or more geographical areas. The one or more smaller areas may for instance not overlap each other so that all one or more smaller areas together cover the same geographical area as the set of tiles (e.g. prior to dividing the set of tiles into one or more tiles). A respective tile of the set of tiles may for instance comprise or represent a respective smaller (e.g. geographic) area. The set of tiles may for instance be divided into a grid. A respective tile of the set of tiles may for instance be determined by at least one point (e.g. a position or a location estimate) located within the respective area of the respective tile. Such at least one point may for instance be the center point of the respective area of the respective tile. Further, a respective tile of the set of tiles may for instance be defined by a diameter and/or the pre-defined size of a rectangular area around/surrounding the at least one point located within the respective area of the respective tile. The geographic area may for instance be the world, which may for instance be divided into smaller areas of the pre-defined size. Further, after such a dividing has taken place, a plurality of tiles, but not all tiles of the set of tiles, of the pre-defined size may respectively cover a part of the world, to name but one non-limiting example.

Once the geographic area of the set of tiles is divided into one or more tiles (e.g. at least one tile), e.g. of a pre-defined size as disclosed above, the method according to the first exemplary aspect of the present invention may for instance perform and/or control the steps of the obtaining of the one or more pieces of respective fingerprint information, and the determining of a respective area type and/or context information for at least one tile of the set of tiles. Optionally, the step of the determining of a respective feature information may for instance be performed and/or controlled. Of course, the method according to the first exemplary aspect of the present invention may for instance perform and/or control the aforementioned steps according to example embodiment of all exemplary aspects of the present invention for all tiles comprised or represented by the set of tiles. Thus, the whole geographic area may for instance be divided into one or more tiles covering one or more smaller areas. Then, for at least one tile (e.g. each respective tile of the set of tiles), the aforementioned steps may for instance be performed and/or controlled.

Within the respective areas of the respective one or more tiles of the set of tiles, one or more venues may for instance be located. Such a venue may for instance be located in a respective area of one tile of the set of tiles. Dependent upon the pre-defined size of the geographic area of a respective tile, and dependent upon the size of a respective venue, one or more venues may for instance be located within one respective area of a respective tile of the set of tiles. Additionally or alternatively, one venue may for instance be located within at least two areas of at least two tiles of the set of tiles.

A respective venue may for instance be a building, office complex and/or building, public accessible location (e.g. station, airport, university, public transport facility, or the like), single floor shopping area respectively mall, multi-floor shopping area respectively mall, hospital, school (e.g. elementary school, high school), residential building, industrial area (e.g. small-scale or large-scale industrial area, factory, major factoring, storage space), to name but a few non-limiting examples. A respective venue may for instance be a building that is visited rarely, but still have important positioning use cases, such as some industry facilities and other functional spaces such as water, waste, or electricity management spaces or storage spaces, to name but a few non-limiting examples.

According to an exemplary embodiment of the first exemplary aspect of the present invention, the method further comprises:

determining a feature information indicative of one or more feature values for the respective area of the respective tile, wherein the feature information is determined based on the one or more pieces of fingerprint information, and the area type and/or context information is determined further based on the feature information.

A respective feature information (e.g. comprising or represented by a vector) may for instance be indicative of one or more feature values for the respective area of the respective tile. A respective feature information may for instance be determined at least partially based on one or more pieces of fingerprint information gathered within a respective area of the respective tile. At least partially based on the respective one or more pieces of fingerprint information, one or more (e.g. useful) features associated with the respective area of the respective tile can be determined respectively derived.

In case a feature vector is represented or comprised by a respective feature information, within the meaning of the present invention, such a feature vector can be considered to be a type of compressed representation of the fingerprint information respectively data of the respective tile/area of the set of tiles. Such a feature vector may for instance be compiled to a format that may for instance be input to a machine learning (e.g. algorithm) which can be used by example embodiments according to all exemplary aspects of the present invention, and further, which may for instance be responsible for the determining of the area type and/or context information (e.g. area type estimation). Such a feature vector may for instance be (e.g. typically) a vector of one or more numerical values.

Such potential features of a respective area of a respective tile of the set of tiles may for instance comprise or represent one or more of the following features and/or attributes:

density or number of radio nodes within a respective area of a respective tile (e.g. Wi-Fi access point/beacon density);

spatial and/or temporal density of one or more pieces of fingerprint information (e.g. fingerprints) gathered within a respective area of a respective tile, wherein the respective one or more pieces of fingerprint information are comprised or represented by the obtained one or more pieces of crowd sourced information;

number of different mobile devices that visited a respective area of a respective tile (e.g. information e.g. on whether a set of visitors may for instance consist mainly of regular staff or of large amount of public);

distribution of collection times of one or more pieces of fingerprint information (e.g. fingerprints) gathered within a respective area of a respective tile (e.g. lots of collection in the evening times may indicate e.g. entertainment or sports facility, collection only on mornings and afternoons may indicate office, collection on evening and morning may include residential areas);

one or more received signal strength features (e.g. values) of one or more pieces of fingerprint information (e.g. fingerprints) gathered within a respective area of a respective tile (e.g. average strongest received signal strength, which may for instance indicate large proportion of data collection indoors);

number of location requests in the respective area of the respective tile;

distribution of altitudes and/or floors of one or more pieces of fingerprint information (e.g. fingerprints) gathered within a respective area of a respective tile (e.g. where fingerprints have been collected);

distribution of mobile device models that have gathered one or more pieces of fingerprint information in a respective area of a respective tile;

distribution of one or more operating systems of one or more mobile devices that have gathered one or more pieces of fingerprint information in a respective area of a respective tile;

amount of movement/number of visited subareas for one mobile device that has gathered one or more pieces of fingerprint information in a respective area of a respective tile;

distribution of movement speeds in the fingerprints, e.g. comprised or represented by one or more pieces of fingerprint information (e.g. fingerprints) gathered within a respective area of a respective tile;

number/frequency/average time difference of separate gathering of one or more pieces of fingerprint information (e.g. fingerprint collection) instants of one mobile device (e.g. this may indicate whether the respective area of the respective tile is typically visited regularly by a common person or just rarely);

availability of GNSS position in the fingerprints, e.g. one or more pieces of fingerprint information (e.g. fingerprints) gathered within a respective area of a respective tile;

one or more features of Wi-Fi SSIDs/BLE URLs (e.g. number of unique SSIDs, ratio of unique SSIDs and/or the total number of radio nodes (e.g. Wi-Fi access points and/or beacon devices), proportion of SSIDs that contain a known business name (e.g. proportion of SSIDs that contain a known clothing store brand name, and/or proportion of SSIDs that contain e.g. one or more Chinese characters, to name but a few non-limiting examples);

proportion of one or more pieces of fingerprint information (e.g. fingerprints) gathered within a respective area of a respective tile, wherein the proportion may for instance be indicative of whether or not a respective mobile device was connected to a Wi-Fi network when it has gathered at least a part of the one or more pieces of fingerprint information;

resemblance of a respective area of a respective tile to one or more neighboring areas one or more further tiles of the set of tiles;

distribution of battery levels during gathering (e.g. measuring) at least a part of the one or more pieces of fingerprint information);

distribution of temperatures during a/the gathering (e.g. measuring) at least a part of the one or more pieces of fingerprint information); and distribution of voice intensity in a respective area of a respective tile, e.g. as far as gathered and/or comprised or represented by one or more pieces of fingerprint information gathered within a respective area of a respective tile.

Any of the above listed features and/or attributes may for instance be considered in absolute terms or in terms of differences between respective features and/or attributes of one or more surrounding areas of one or more surrounding tiles of the respective tile. Any of the above listed features and/or attributes may for instance be comprised or represented by a respective feature information. As disclosed above, such a feature information, and therefore any of the above listed features and/or attributes may for instance be comprised or represented by a feature vector, e.g. in the form of one or more numerical values.

The one or more pieces of fingerprint information comprised by the one or more pieces of crowd-sourced information may for instance be obtained, e.g. by retrieving the one or more pieces of fingerprint information from the one or more pieces of crowd-sourced information. For instance, the one or more pieces of crowd-sourced information may for instance comprise or represent a plurality of pieces of fingerprint information which were gathered in the geographic area (e.g. the world) prior to the obtaining of the one or more pieces of crowd-sourced information. After the geographic area is divided into one or more smaller areas (e.g. each represented by a respective tile of the set of tiles), dependent upon a respective tile, only the one or more pieces of fingerprint information that were gathered in a respective area of a respective tile may for instance be obtained (e.g. retrieved). Additionally or alternatively, the one or more pieces of fingerprint information may for instance be obtained, e.g. by receiving the one or more pieces of fingerprint information. For instance, a request to receive the one or more pieces of fingerprint information in response to the request may for instance be output (e.g. sent), e.g. to a memory storing the one or more pieces of crowd-sourced information. The one or more pieces of fingerprint information may for instance be received from an entity that is different from an entity storing the one or more pieces of crowd-sourced information (e.g. a memory), which relays the one or more pieces of fingerprint information to the apparatus performing and/or controlling the method according to the first exemplary aspect of the present invention.

In case the one or more pieces of crowd-sourced information do not comprise or represent additional pieces of information so that the one or more pieces of crowd-sourced information are equal to one or more pieces of fingerprint information, then a part of the one or more pieces of fingerprint information may for instance be obtained for at least one tile of the set of tiles, wherein the part of the one or more pieces of fingerprint information comprise such one or more pieces of fingerprint information that were gathered at one or more certain locations of a respective area of a respective tile.

For instance, the one or more pieces of fingerprint information may for instance be obtained out of the one or more pieces of crowd-sourced information (e.g. crowd-sourced data), e.g. based on a respective location (e.g. estimate) comprised or represented by a respective piece of fingerprint information of the one or more pieces of fingerprint information. It may for instance be compared whether or not the location (e.g. a location estimate) is located within a respective area of a respective tile of the set of tiles.

After the obtaining of the one or more pieces of fingerprint information, a respective area type and/or context information is determined (e.g. calculated). Such a respective area type and/or context information may for instance be indicative of a type of area and/or venue located within the respective tile and/or context the respective area of the respective tile is (e.g. in general) used for. Further, such a respective area type and/or context information may for instance be indicative of a context of an infrastructure (e.g. one or more venues) located within a respective area of a respective tile enabling to differentiate the infrastructure from similar infrastructure (e.g. enabling to differentiate a small doctor's office from a hospital, to name but one non-limiting example).

A respective area type and/or context information may for instance be determined by estimating an area type/context of a respective (e.g. geographical) area of a respective tile. For instance, a respective area type and/or context information may be determined (e.g. estimated) at least partially based on a respective feature information. Thus, e.g. one or more features and/or attributes (as represented by a respective feature information) associated with a respective area of a respective tile may for instance be analyzed to determine a respective area type and/or context information. Such a determined area type and/or context information may for instance be indicative of the general usage a respective area of a respective tile.

For instance, in case that within a respective area of a respective tile a shopping mall is located, the respective area type and/or context information may for instance comprise or represent the information "shopping mall". Further, in case additionally in the respective area of the respective tile some residential houses are located, but the main part of the respective area is covered by such a shopping mall, the respective area type and/or context information may for instance be determined to comprise or represent the information "shopping mall", since this can be considered to be the general usage respectively context of the respective area of the respective tile.

A respective area type and/or context information may for instance be determined, e.g. by computing the respective area type and/or context information at least partially based on the obtained one or more pieces of fingerprint information that may for instance be crowd-sourced within the respective area of the respective tile. Thus, such one or more pieces of fingerprint information may for instance be associated with the respective area of the respective tile.

Each crowd-sourced information of the one or more pieces of crowd-sourced information may for instance comprise or represent at least a reference position (e.g. a 2D (e.g. x- and y-coordinates), 2.5D (e.g. x- and y-coordinates, relative altitude (e.g. change of height) or floor value), or a 3D (x- and y-coordinates, absolute altitude (e.g. height above sea level) or floor value); x- and y-coordinates may for instance be represented also by latitude- and longitude coordinates) reference position), but typically also other pieces of information (e.g. payload data) such as one or more radio measurements (e.g. observed Wi-Fi access points and/or BLE beacons' identifiers, their received signal strengths, and/or SSIDs), time stamps, speed, reference position measurement technology, collection device information, battery level data, environment sensor data, or a combination thereof, to name but a few non-limiting examples. At least a part of such aforementioned information may for instance be comprised or represented by a respective crowd-sourced information. Some of the aforementioned information may for instance be comprised or represented by a respective fingerprint information that may for instance be comprised or represented by a respective crowd-sourced information as well.

It will be understood that in an exemplary embodiment to the first exemplary aspect of the present invention, the obtaining of the one or more pieces of fingerprint information, and the determining of the area type and/or context information may for instance be performed and/or controlled for each tile of the set of tiles. Thus, the steps may for instance be performed a plurality of times (e.g. at least twice) in case of a plurality of tiles being comprised by the set of tiles.

The one or more pieces of crowd-sourced information may for instance be hold (e.g. stored) by a crowd-sourcing data processing server (or server cloud) that may for instance be part of a system (e.g. general system architecture) according to example embodiments of all exemplary aspect of the present invention. Such a server may for instance hold (e.g. store) a large collection of pieces of fingerprint information gathered respectively collected by one or more mobile (client) devices, and optionally, one or more (e.g. further) information as disclosed above. Together, such one or more pieces of fingerprint information, and optional (e.g. further) information may for instance form the one or more pieces of crowd-sourced information. The obtaining of the one or more pieces of crowd-sourced information may for instance be a receiving of the one or more pieces of crowd-sourced information from such a crowd-sourcing data processing server. Some or all of the pieces of fingerprint information, and optional (e.g. further) information may for instance comprise or represent data that can be used in determining one or multiple feature values as represented by a respective feature information of a respective area of a respective tile.

A respective area type and/or context information may for instance be stored, e.g. in a memory (e.g. a database), e.g. that is comprised by or connectable to the apparatus that performs and/or controls the method according to the first exemplary aspect of the present invention.

Additionally or alternatively, such a respective area type and/or context information may for instance be stored in/by one or more (e.g. indoor) radio maps, e.g. one or more radio maps for the respective area of the respective tile, and/or for one or more venues located within a respective area of a respective tile. The stored respective area type and/or context information may for instance be utilized respectively used, e.g. when determining a location estimate for a mobile device, e.g. that is located within the respective area of the respective tile (e.g. in a venue located within the respective area of the tile, to name but one non-limiting example) and which may for instance request its respective position to be determined (e.g. by requesting a location estimate to be determined), and/or determine its respective position at least partially based on a provided radio map comprising or representing a determined respective area type and/or context information. For instance, in case such a respective area type and/or context information represents a "shopping mall" type, a mobile device determining a location estimate may for instance not try to determine a GNSS-based location estimate, and determine the location estimate directly based on a non-GNSS based positioning system. This may for instance reduce the battery consumption of a respective mobile device.

The respective area type and/or context information may for instance be associated with a respective tile of the set of tiles. Additionally or alternatively, the respective area type and/or context information may for instance be comprised by the respective tile of the set of tiles.

Optionally, the method further comprises:
  providing the respective area type and/or context information to be utilized in a positioning.

The respective area type and/or context information may for instance be provided, e.g. by outputting (e.g. sending) the respective area type and/or context information to another entity. The other entity may for instance utilize a received area type and/or context information for further purposes. In case at least two pieces of area type and/or context information for at least two tiles of the set of tiles are determined, of course, it may not be required to provide the at least two area type and/or context information in a sequential manner, but provide them together with one transmission.

According to an exemplary embodiment of the first exemplary aspect of the present invention, the method further comprises:
  determining a priority information indicative of a crowd-sourcing priority value for the respective area of the respective tile, wherein the priority information is determined at least partially based on the area type and/or context information; and
  associating the respective tile of the set of tiles with the determined priority information.

The priority information may for instance comprise or represent a value indicating how important it is considered that one or more further pieces of fingerprint information and/or crowd-sourced information are gathered (e.g. by one or more mobile device, e.g. mobile device(s) according to the second exemplary aspect of the present invention) in the respective area of a respective tile of the set of tiles. Thus, a respective priority information may for instance be associated with a respective tile of the set of tiles. A respective priority information may for instance be determined (e.g. estimated) for a respective area and/or a respective tile of the set of tiles.

Since a respective priority information may for instance comprise or represent a value indicating how important it is considered that one or more further pieces of fingerprint information and/or crowd-sourced information are gathered in a respective area, a value comprised by or represented by a respective priority information may for instance be in a pre-defined range. This may for instance enable to set and/or match one or more pieces of priority information determined for one or more respective tiles of the set of tiles into relation.

For instance, a priority information may for instance be determined to comprise or represent a value in the range of [0; 1], wherein a value of 0 may for instance indicate that the importance that one or more further pieces of fingerprint information and/or crowd-sourced information are gathered is set to the lowest. For instance, in this case, it may not be required (at all) that such further one or more pieces of fingerprint information and/or crowd-sourced information are gathered.

Further, a value of 1 of a respective priority information may for instance indicate that the importance that one or more further pieces of fingerprint information and/or crowd-sourced information are gathered is set to the highest. For instance, in this case, it may be required that such further one or more pieces of fingerprint information and/or crowd-sourced information are gathered. Additionally or alternatively, in case a respective mobile device (e.g. at least one mobile device performing and/or controlling the method according to the second exemplary aspect of the present invention) is enabled (e.g. certain pre-requirements are met) to gather one or more further pieces of fingerprint information and/or crowd-sourced information, in such one or more respective areas of one or more respective tiles associated with a priority information comprising or representing a value of 1, the one or more further pieces of fingerprint information and/or crowd-sourced information are gathered e.g. prior to one or more other pieces of fingerprint information and/or crowd-sourced information for one or more respective areas that are different from the one or more respective areas of one or more tiles being associated with one or more respective pieces of priority information of the value 1, and that may for instance be associated with one or more pieces of priority information comprising or representing a value of less than 1.

Thus, e.g. personnel who administrate a crowd-sourcing system and may for instance not be required to define the collection priority for each area type/context manually. Thus, a respective priority information may for instance be e.g. a number between 0 (no collection needed) and 1 (collect whenever possible).

According to an exemplary embodiment of the first exemplary aspect of the present invention, the priority information is determined to comprise or represent a default value in case the respective area of the respective tile lacks a sufficient amount of pieces of fingerprint information obtainable to enable determining of the area type and/or context information.

A sufficient amount respectively number of pieces of fingerprint information may for instance be pre-defined or defined according to pre-defined rules. For instance, such a sufficient amount may for instance be set by a certain number of pieces of fingerprint information that were gathered in a respective area of a respective tile. Such a sufficient amount may for instance be a threshold value. Such a sufficient amount may for instance be pre-defined by a certain density of pieces of fingerprint information gathered within a respective area of a respective tile. In case such a sufficient amount of pieces of fingerprint information is not obtainable for a respective area of a respective tile, the respective priority information may for instance be determined (e.g. set) to comprise or represent a default value, e.g. a value of 0.5 in case the priority information may for instance be determinable to comprise or represent a value in the range of 0 to 1, to name but one non-limiting example.

According to an exemplary embodiment of the first exemplary aspect of the present invention, the area type and/or context information is determined by a machine learning network, and the method further comprises:
  determining one or more parameters of the machine learning network at least partially based on one or more pieces of fingerprint information comprised or represented by the one or more pieces of crowd-sourced information, wherein the one or more parameters are indicative of one or more adaptive variables used by the machine learning network to determine an output, and wherein the output represents an area type and/or context information.

The machine learning network may for instance be a supervised machine learning network.

The determining of the one or more parameters may for instance be performed and/or controlled during a training stage of the machine learning network. Thus, the one or more pieces of fingerprint information that are used for training of the machine learning network may for instance originate from one or more tiles whose respective area type and/or context information is/are known. Such tiles in combination with the one or more pieces of fingerprint information may for instance be pre-defined specifically for training purposes of the machine learning network. For instance, a specific set of tiles whose respective pieces of area type and/or context information are known, and the respective one or more pieces of fingerprint information of these one or more tiles may for instance be used in training the machine learning network.

Additionally or alternatively, the determining of the one or more parameters may for instance be performed and/or controlled to determine one or more pieces of area type and/or context information for one or more tiles whose respective area type and/or context information is not known, e.g. during general operation of the machine learning network. The output of the machine learning network may for instance be such an area type and/or context information, e.g. requested to be determined. Further, the one or more parameters may for instance be adapted during usage of the machine learning network after e.g. the training stage was completed so that (e.g. iteratively) the one or more parameters of the machine learning network may for instance be improved.

The one or more parameters of the (e.g. supervised) machine learning network may for instance be determined at least partially based on obtained fingerprint information (e.g. one fingerprint information, or more than one piece of fingerprint information) that respectively were gathered within a tile whose area type and/or context information is input to the (e.g. supervised) machine learning network, e.g. to determine an area type and/or context information as an output. The one or more parameters may for instance influence the output of the machine learning network, e.g. in case the machine learning network determines one or more pieces of (unknown) area type and/or context information for one or more tiles of the set of tiles.

The respective area type and/or context information may for instance be determined by an area type/context estimation. The respective area type and/or context information may for instance be determined, e.g. by using one or more supervised machine learning methods, such as one or more classification methods (also referred to as classifier(s)). Such a classification method may for instance be defined by the one or more parameters. Such a classification method may for instance at least partially be based on a corresponding algorithm, which may for instance be trained by using a set of input areas with known feature information (e.g. represented by a respective feature vector, as disclosed above) and known area type/context. Such a feature information for a certain tile of a set of input areas may for instance be determined based on the one or more pieces of crowd-sourced information.

After sufficient training, the classifier may for instance determine the most likely area type (to be represented by a respective area type and/or context information) of any given feature information respectively feature vector of the certain area of the respective tile. Such a supervised machine learning method can be e.g. a Bayesian classifier, a neural network, a linear classifier, a support vector machine, a k-nearest neighbor classifier, a decision tree, or a combination thereof, to name but a few non-limiting examples.

For instance, such a training may for instance be performed and/or controlled prior to performing and/or controlling the method according to the first exemplary aspect of the present invention. Alternatively, such a training may for instance be part of the method according to the first exemplary aspect of the present invention.

For instance, such a training may for instance be performed and/or controlled as follows: the personnel who administrate a crowd-sourcing system may for instance choose a set of areas whose area types are known, e.g. known area type and/or context information. This choice can happen manually or automatically based on some (e.g. pre-defined) rules. For each chosen area, a respective server obtains (e.g. retrieves or fetches) the respective pieces of fingerprint information associated with the respective area, determines (e.g. computes) a respective feature information (e.g. a feature vector) of the respective area, and further, inputs the pair (feature information, area type and/or context information) to the training method. When a representative enough set of areas from each area type (e.g. as representable by a respective area type and/or context information) has been input to the training method, the classification method can, with a high probability, determine the correct area type to be comprised or represented by a respective area type and/or context information of a new area of a tile of the set of tiles at least partially based on a respective feature information (e.g. a known feature vector).

After the training part, the apparatus according to the first exemplary aspect of the present invention may for instance perform and/or control the method according to the first exemplary aspect of the present invention, and optionally, determine a respective priority information (e.g. representing crowd-sourcing priorities) of all the areas/tiles of the set of tiles (e.g. the world), e.g. all the tiles of the set of tiles having a sufficient number of associated pieces of fingerprint information.

The apparatus may for instance take the obtained one or more pieces of fingerprint information of one area of a respective tile of the set of tiles at a time, determines (e.g. computes) the respective feature information (e.g. feature vector) of the respective area, and inputs the respective feature information to a readily trained supervised machine learning entity (e.g. part of a system according to example embodiments of the present invention), which may for instance then return the determined (e.g. estimated) area type and/or context information of the respective area. Because each possible area type of the area type and/or context information may for instance have a certain human-defined crowd-sourcing priority, the apparatus according to the first exemplary thus may for instance obtain the crowd-sourcing priority for respective area of the respective tile of the set of tiles. The respective crowd-sourcing priority can be e.g. a number between 0 (no collection needed) and 1 (collect whenever possible). The respective priority information may for instance be determined to comprise or represent a value between 0 and 1.

According to an exemplary embodiment of all exemplary aspects of the present invention, the crowd-sourcing priority represents whether or not further gathering (e.g. crowd-sourcing) of one or more pieces of fingerprint information for the respective geographic area of the tile is needed or not.

According to an exemplary embodiment of the first exemplary aspect of the present invention, the method further comprises:

providing (e.g. outputting) the respective priority information and/or the respective tile (or, one or more tiles) of the set of tiles associated with the respective priority information (e.g. to one or more mobile devices).

The respective priority information and/or the respective tile may for instance be provided (e.g. output) to at least one mobile device (e.g. the at least one mobile device performing and/or controlling the method according to the second exemplary aspect of the present invention). Alternatively, the respective priority information and/or the respective tile may for instance be provided (e.g. output) to an entity that is different from the at least one mobile device, which relays the respective priority information and/or the respective tile upon its reception to the at least one mobile device.

Instead of providing the respective priority information and/or the respective tile associated with the respective area the step of providing may for instance be performed and/or controlled only once, e.g. providing the one or more pieces of priority information and/or the one or more tiles of the set of tiles associated with the one or more pieces of priority information all in one step. This may for instance be performed and/or controlled, e.g. after the obtaining of the one or more pieces of fingerprint information, and the determining of the area type and/or context information is performed and/or controlled for each tile of the set of tiles.

According to an exemplary embodiment of the first exemplary aspect of the present invention, the method further comprises:

obtaining (e.g. receiving) one or more pieces of crowd-sourced information in response to at least one (e.g. respective and) provided priority information and/or respective tile of the set of tiles associated with the respective priority information, wherein said obtained one or more pieces of crowd-sourced information were gathered in one or more respective areas of the one or more respective tiles with which the at least one provided priority information is associated.

The obtaining of these one or more pieces of crowd-sourced information may for instance be performed and/or controlled in the same way as disclosed above. These one or more pieces of crowd-sourced information may for instance be one or more pieces of new and/or updated crowd-sourced information that may for instance be gathered by one or more mobile devices at least partially based on at least one priority information that was provided (e.g. output) to the one or more mobile devices. Such one or more mobile devices may for instance perform and/or control the method according to the second exemplary aspect of the present invention.

Of course, these obtained one or more pieces of further (also referred to as new and/or updated) crowd-sourced information may for instance then be utilized, e.g. to update one or more (e.g. indoor) radio maps, to name but one non-limiting example, for one or more venues located in a respective tile and/or a geographic area of a respective tile of the set of tiles.

According to an exemplary embodiment of all exemplary aspects of the present invention, each piece of the one or more pieces of fingerprint information (e.g. represented by one or more pieces of fingerprint information) comprises or represents one or more of the following:

a reference position at which a respective crowd-sourced information was gathered;

one or more identifiers of one or more radio nodes which sent one or more signals were observable at the position at which a respective crowd-sourced information was gathered; and one or more received signal strength values, wherein the one or more received signal strength values were gathered (e.g. measured) based on one or more signals sent by one or more radio nodes, which sent one or more signals of the one or more radio nodes were observable at the position at which a respective crowd-sourced information was gathered.

A respective fingerprint information may for instance be gathered (e.g. measured), e.g. by a respective mobile device (e.g. a mobile device according to the second exemplary aspect of the present invention).

Further, a respective fingerprint information may for instance comprise or represent one or more SSIDs of the one or more radio nodes (e.g. one or more Wi-Fi access points). Such one or more SSIDs may for instance be one or more identifiers of the one or more radio nodes.

For the gathering of a respective fingerprint information, an apparatus (e.g. a mobile device according to the second exemplary aspect of the present invention) may detect and/or measure signals sent by a one or more radio nodes and measure their respective signal strengths. The mobile device may transmit the results of the measurements along with one or more identifiers of the respective radio nodes to another apparatus, e.g. a radio map and positioning server, and/or an apparatus according to the first exemplary aspect of the present invention. An identifier may be for instance in the form of a SSID, and further, the results of the measurements may be for instance in the form of a received signal strength indicator (RSSI). An apparatus determining a location estimate may evaluate the signals taking account of data, e.g. stored in radio maps (e.g. generated from one or more pieces of crowd-sourced information) and returns a position (e.g. in the form of coordinates) that are consistent with the measured signal strengths of the one or more radio nodes.

The one or more radio nodes may for instance be comprised by a respective venue, e.g. by an infrastructure of the respective venue. Such a radio node of the one or more radio nodes may for instance be a radio node, e.g. of the venue. Such a radio node may for instance be used for indoor positioning and/or floor detection, e.g. according to BT- (Bluetooth) and/or BLE- (Bluetooth Low Energy) specification, or may for instance be a Wi-Fi Access Point for indoor positioning and/or floor detection, e.g. according to the WLAN- (Wireless Local Area Network) specification).

Such a radio node (e.g. WiFi access point, beacon, or a combination thereof, to name but a few non-limiting examples) of the one or more radio nodes, e.g. of the venue, may for instance comprise or be connectable to a transceiver, e.g. according to the BT-, BLE, and/or WLAN-specification to provide wireless-based communication. Each radio node of the one or more radio nodes, e.g. of the venue, may for instance use such a transceiver for transmitting and/or broadcasting one or more signals, e.g. comprising one or more information, such as a SSID of the respective radio node of the one or more radio nodes.

The one or more radio nodes may for instance be (e.g. Wi-Fi) access points or beacons, e.g. according to wireless communication standard, such as IEEE 802.11, or BLE, or BT communication standard.

The method according to the second exemplary aspect of the present invention, performed by the at least one mobile device, may for instance be performed and/or controlled in conjunction with the method according to the first exemplary aspect of the present invention, performed by the apparatus.

The one or more pieces of priority information and/or one or more tiles of a set of tiles may for instance be obtained (by the at least one mobile device), e.g. by receiving the one or more pieces of priority information and/or one or more tiles of a set of tiles. The one or more pieces of priority information and/or one or more tiles of a set of tiles may for instance be obtained, e.g. by receiving the one or more pieces of priority information and/or one or more tiles of a set of tiles from the apparatus performing and/or controlling the method according to the first exemplary aspect of the present invention.

Based on the one or more pieces of priority information and/or one or more tiles of a set of tiles obtained, one or more pieces of fingerprint information are gathered (e.g. measured).

The gathering of the one or more pieces of fingerprint information may for instance be performed and/or controlled in the same way, as disclosed above with respect to the first exemplary aspect of the present invention. Further, a respective piece of fingerprint information may for instance comprise or represent any of the information as disclosed above in conjunction with the first exemplary aspect of the present invention.

According to an exemplary embodiment of the second exemplary aspect of the present invention, the one or more pieces of fingerprint information are gathered in case the at least one mobile device is located within a respective geographic area of a tile of the one or more tiles with which at least one priority information of the one or more pieces of priority information is associated with.

For instance, a mobile crowd-sourcing client device, such as the at least one mobile device performing and/or controlling the method according to the second exemplary aspect of the present invention, may for instance know a rough region where it is most probably being used (e.g. highest usage frequency in history, to name but one non-limiting example). The at least one mobile device may thus obtain (e.g. receive or download) the respective pieces of priority information (e.g. representing crowd-sourcing priorities) which indicate certain areas in which further gathering of pieces of fingerprint information is considered to be necessary. For instance, the at least one mobile device may for instance obtain only such pieces of priority information for certain areas of one or more tiles of the set of tiles, in which areas the at least one mobile device may for instance be (quite) often located.

According to an exemplary embodiment of the second exemplary aspect of the present invention, the one or more pieces of fingerprint information are gathered in case one or more further requirements are met, wherein the one or more further requirements are indicative of available resources of the at least one mobile device.

When the at least one mobile device is able to do crowd-sourcing, for instance a reference position is available and/or possible other requirements are met (e.g. sufficient battery level, sufficient distance in time and space from the previous crowd-sourcing sessions, sufficient number of Wi-Fi access points observed, or a combination thereof, to name but a few non-limiting examples), the at least one mobile device may for instance start the gathering. For instance, the at least one mobile device may for instance determine (e.g. decide) based on the one or more pieces of obtained priority information (e.g. crowd-sourcing priority/priorities) in the current reference position whether it may for instance start a new data collection session or not. Then, e.g. the gathering of the one or more pieces of fingerprint information in the respective area may for instance take place.

According to an exemplary embodiment of the second exemplary aspect of the present invention, the method further comprises:
  determining whether or not the one or more pieces of fingerprint information are gathered prior to the gathering of the one or more pieces of fingerprint information, wherein a comparison of a respective priority information of a respective tile and a pseudo-random number (e.g. from a continuous uniform distribution) is performed and/or controlled, so that the gathering of one or more pieces of fingerprint information is more likely in case a respective priority information represents a high priority than in case the respective priority information represents a low priority.

Further, a respective pseudo-random number may for instance equal u, a respective priority information may for instance represent or comprise the value p, wherein p may for instance be within the range of [0;1]. Then, it may for instance be compared whether u≤p. If u>p, the gathering of the one or more pieces of fingerprint information may for instance not be performed and/or controlled, e.g. within a certain time duration (e.g. starting from a generating of the pseudo-random number u, to name but one non-limiting example). For instance, if the crowd-sourcing priority as represented by a respective priority information is a number of p between 0 and 1, the at least one mobile device may generate a pseudo-random number u, e.g. from a continuous uniform distribution between 0 and 1. If now the at least one mobile device determines that u>p, no data collection session will be started e.g. within one hour of generating u. Thus, no pieces of fingerprint information are gathered by the at least one mobile device, e.g. within the next hour. This enables e.g. that the gathering of the one or more pieces of fingerprint information does not start, e.g. within the certain time duration (e.g. one hour of generating u, to name but one non-limiting example). Further, e.g. the greater the crowd-sourcing priority p, the more likely the at least one mobile device is to start a data collection session of gathering the one or more pieces of fingerprint information in the respective area.

The proposed approach enables concentrating crowd-sourcing data collection on certain important areas associated with certain area types/contexts. This is advantageous since the crowd-sourcing clients (e.g. the at least one mobile device) may for instance typically collect only a limited amount of crowd-sourcing data (e.g. as represented by one or more pieces of gathered fingerprint information) per a time period, e.g. due to constraints in energy, memory, and data transfer consumptions of the at least one mobile device.

The solution according to all exemplary aspect of the present invention may require additional communication between a client (e.g. the at least one mobile device performing and/or controlling the method according to the second exemplary aspect of the present invention) and a server (e.g. the apparatus performing and/or controlling the method according to the first exemplary aspect of the present invention), although the amount of transferred data is typically small compared e.g. to the amount of transferred fingerprint data. This additional communication may for instance comprise e.g. one or more pieces of priority information (e.g. the crowd-sourcing priorities), as disclosed above. Some area types may not be related to a clearly distinctive set of feature values contained by the fingerprints respectively fingerprint information.

According to an exemplary embodiment of the second exemplary aspect of the present invention, the method further comprises:

providing the gathered one or more pieces of fingerprint information.

The gathered one or more pieces of fingerprint information may for instance be provided (e.g. output) to one or more entities (e.g. the apparatus performing and/or controlling the method according to the first exemplary aspect of the present invention). Alternatively, the gathered one or more pieces of fingerprint information may for instance be provided (e.g. output) to an entity that is different from the apparatus, which relays the gathered one or more pieces of fingerprint information to the apparatus performing and/or controlling the method according to the first exemplary aspect of the present invention.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
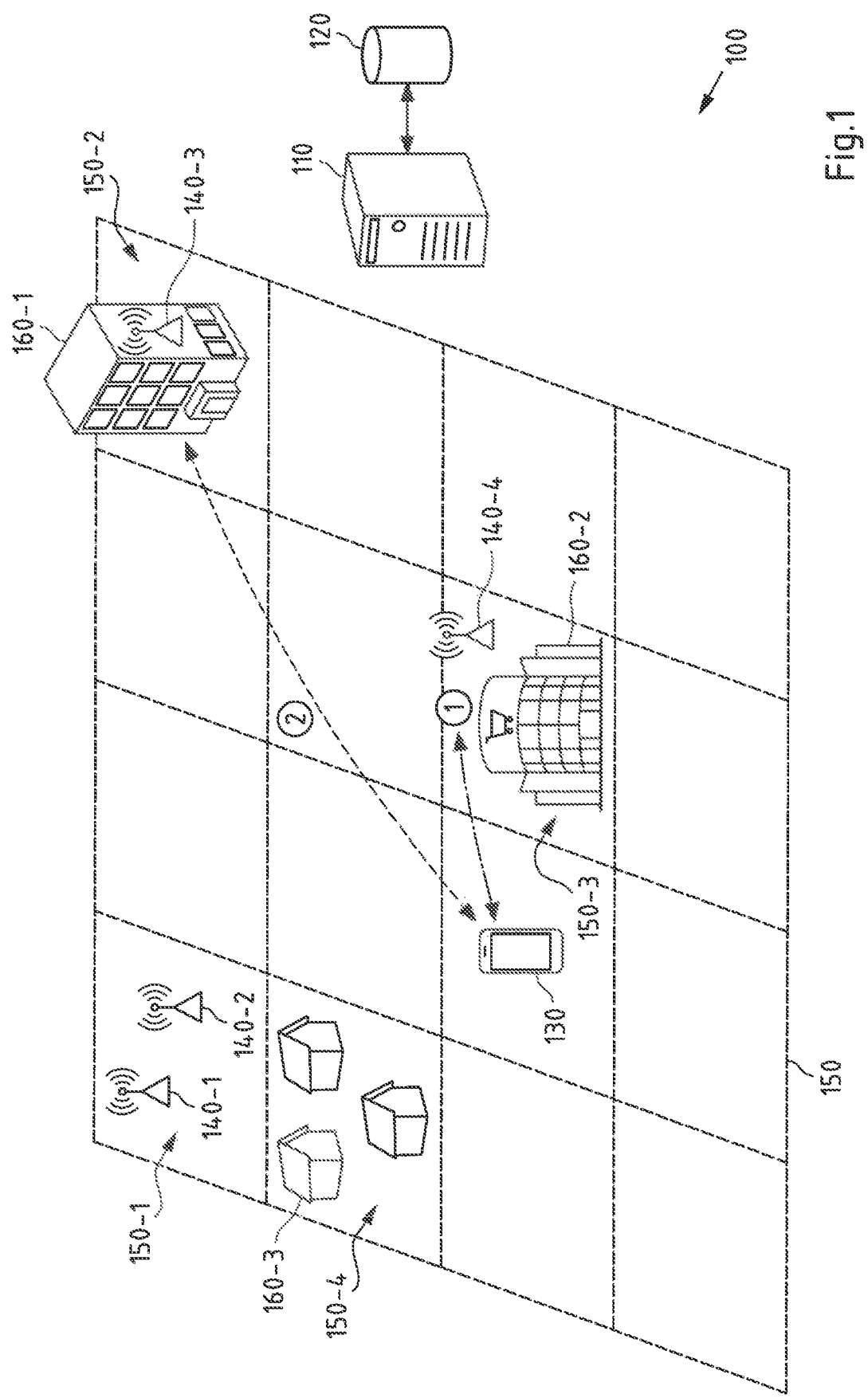
FIG. 1 a schematic block diagram of a system according to an exemplary aspect of the present invention.

FIG. 1 is a schematic high-level block diagram of a system 100 according to an exemplary aspect of the present invention. Such a system 100 may for instance represent a generic system architecture as used by one or more exemplary embodiments according to all exemplary aspects of the present invention.

System 100 comprises a server 110, an optional database 120, and at least one mobile device 130. Further, in FIG. 1 an area 150 is divided into a set of tiles, wherein in the area 150 exemplary tiles 150-1, 150-2, 150-3, and 150-4 are marked. It will be understood that the respective method(s) according to all exemplary aspects of the present invention may for instance be applied to one or more further tiles of the shown set of tiles of the geographic area 150 (e.g. tiles which are not marked by a reference numeral). Further, system 100 comprises one or more radio nodes 140, which are located within the geographic area 150. For instance, radio nodes 140-1 and 140-2 are located within the tile 150-1, radio node 140-3 is located within the tile 150-2, and radio node 140-4 is located within the tile 150-3.

In the geographic area 150, one or more venues 160 are located. For instance, a venue 160-1 in the form of an office building is located within the tile 150-2, a venue 160-2 in the form of a shopping mall is located within the tile 150-3, and one or more venues 160-3 in form of one or more residential buildings are located within the tile 150-4.

The venues 160 are exemplary illustrated without taking into account the size of the illustration with respect to the size of the geographic area 150.

The mobile device 130 may for instance be movable. The mobile device 130 may for instance move in between one or more respective tiles. Exemplary positions and/or movement paths of the mobile device 130 are illustrated by the encircled numbers 1 and 2. The positions and/or movement paths indicated by the encircled numbers 1 and 2 of the mobile device 130 are exemplary positions and/or paths. Of course, the mobile device 130 may move into any possible position and/or move along any possible path.

The mobile device 130 may for instance be configured to perform and/or control the method according to the second exemplary aspect of the present invention. The server 110 may for instance be configured to perform and/or control the method according to the first exemplary aspect of the present invention. Communication may for instance take place between the server 110, the mobile device 130, and/or the one or more radio nodes 140, e.g. via a wireless communication connection (e.g. via a cellular and/or non-cellular communication network, to name but a few non-limiting examples).

The server 110 may alternatively be embodied as a server cloud (e.g. a plurality of server connected, e.g. via a communication network such as the Internet, and providing services at least partially jointly). The server 110, which may for instance be embodied as a positioning server, may for instance be further configured to determine one or more pieces of area and/or context information, to name but one non-limiting example.

The database 120 may for instance be optional. The database 120 may for instance comprise a memory, e.g. for storing one or more pieces of crowd-sourced information, one or more tiles, one or more sets of tiles, one or more pieces of feature information, one or more pieces of fingerprint information, one or more pieces of area and/or context information, one or more pieces of priority information, one or more radio maps, or a combination thereof, to name but a few non-limiting examples.

The radio nodes 140 may for instance be embodied as Wi-Fi access points, and/or BLE beacons, to name but a few non-limiting examples.

The system 100 may for instance enable the following example embodiment according to all aspects of the present invention:

It is enabled a solution in which crowd-sourcing (e.g. performed by one or more mobile devices, e.g. mobile device 130) takes place mostly at interesting environments (e.g. within one or more tiles 150-1 to 150-4) since performing of data collection may for instance not be performable all the time by the one or more mobile devices. In other words, the solution enables to optimize the usage of resources (of the one or more mobile devices) for crowd-sourcing (e.g. with respect to battery, memory, data transfer usage).

The crowd-sourcing data may for instance be processed by a server (e.g. server 110) which may for instance determine one or more pieces of priority information associated with one or more tiles (e.g. the one or more tiles 150-1 to 150-4, or any kind of one or more tiles). Such crowd-sourcing priorities may for instance be determined (e.g. at least partially) automatically e.g. based on previously crowd-sourced data (e.g. one or more pieces of obtained crowd-sourced information). This may for instance be done e.g. by determining (e.g. estimating) one or more pieces of area type and/or context information (e.g. representing the area type/context of each geographical area of a respective tile of a set of tiles). The (e.g. set of) possible area types/contexts as represented by the one or more pieces of area type and/or context information may for instance comprise (e.g. include) e.g. single-floor shopping area, multi-floor shopping center (e.g. as represented or comprised by tile 150-3), hospital, rural area, public transport facility, office building (e.g. as represented or comprised by tile 150-2), elementary school, university, residential area (e.g. as represented or comprised by tile 150-4), small-scale industrial area (e.g. as represented or comprised by tile 150-1), major factory, storage space. Division of a geographic area (e.g. geographic area 150) into (e.g. smaller) geographical areas as represented by one or more tiles (e.g. tiles 150-1 to 150-4) may for instance be based on a pre-defined size, e.g. regular 100 m×100 m tiling.

Further, to each respective tile of the set of tiles, a priority information may for instance be determined (e.g. by server 110). Further, the determined priority information may for instance be associated with a respective tile (e.g. one of the tiles 150-1 to 150-4). Then, e.g. the respective priority information may for instance be provided (e.g. from the server 110 to the mobile device 130). The mobile device 130 may for instance move within the geographic area 150. Thus, when the mobile device 130 may for instance have moved e.g. to tile 150-3, wherein in the respective area of the tile 150-3 e.g. a shopping mall is located, the mobile device 130 may for instance gather one or more pieces of (further) fingerprint information within the respective area of the tile 150-3, since e.g. the respective priority information as associated with the respective tile 150-3 may for instance represent a high priority. Thus, the mobile device 130 may for instance perform and/or control crowd-sourcing (e.g. gathering and/or collecting crowd-sourced information respectively data) within the respective area of the tile 150-3. In contrast, a respective priority information associated with the tile 150-1 representing a small-scale industrial area, may for instance represent or comprise a lower priority compared to the priority information associated with the tile 150-3 so that one or more resources of the respective mobile device 130 may for instance be used for gathering one or more pieces of fingerprint information in the respective area of the tile 150-1 e.g. only in case the respective mobile device 130 may for instance have performed and/or controlled crowd-sourcing in the respective area of the tile 150-3 earlier.

Figure 2:
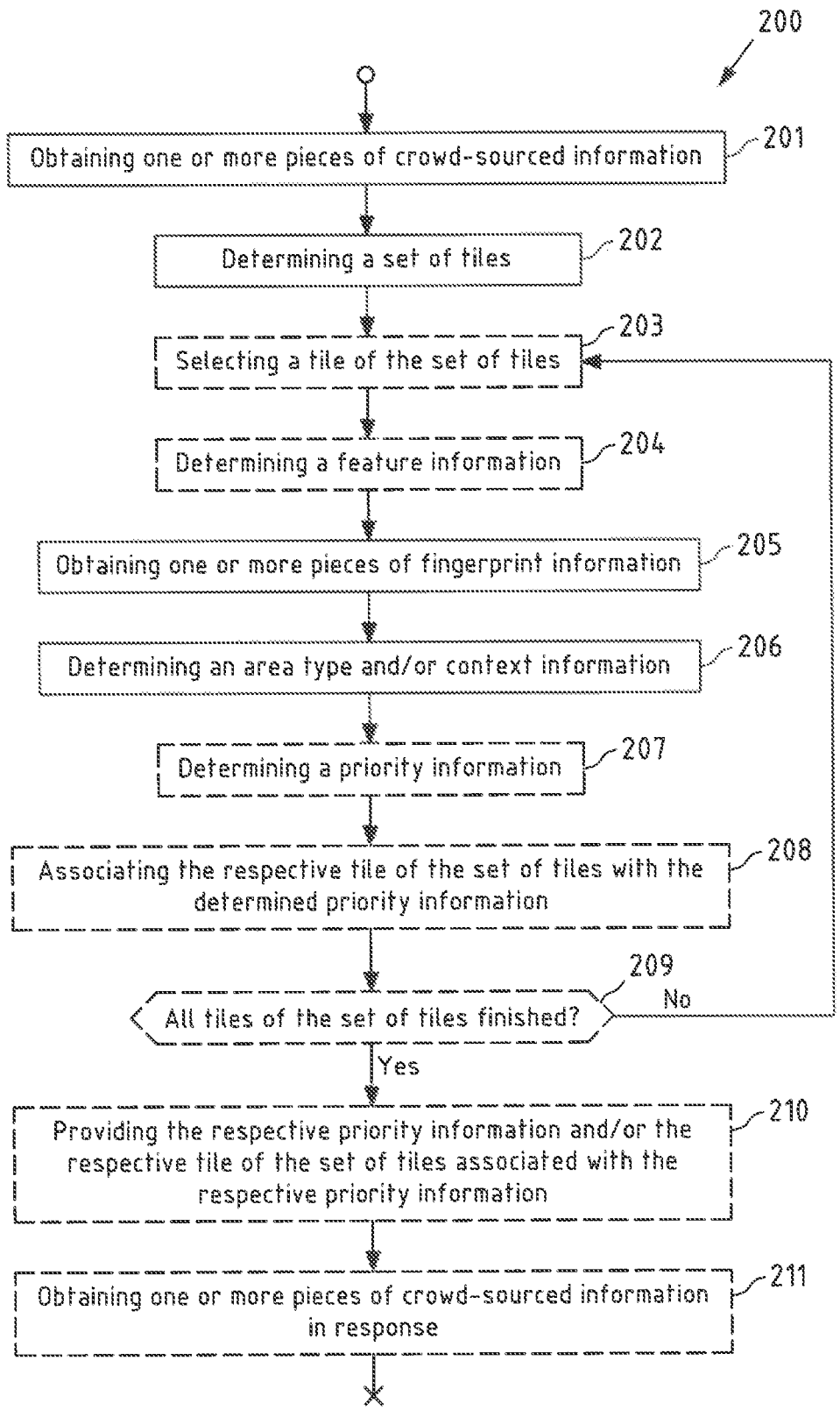
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a server, e.g. server 110 of FIG. 1. This flowchart 200 may for instance be performed and/or controlled by apparatus 400 of FIG. 4.

In a first step 201, one or more pieces of crowd-sourced information are obtained, e.g. by receiving the one or more pieces of crowd-sourced information, e.g. from one or more mobile devices (e.g. mobile devices 130 of FIG. 1). Alternatively, the one or more pieces of crowd-sourced information are obtained, e.g. by retrieving the one or more pieces of crowd-sourced information, e.g. from a memory storing the one or more pieces of crowd-sourced information. Such a memory may for instance be comprised or represented by a database (e.g. database 120 of FIG. 1). Such a memory may for instance be comprised by or connectable to the apparatus performing and/or controlling the flowchart 200.

In a second step 202, a set of tiles is determined. The set of tiles may for instance be determined at least partially based on one or more geographic areas as represented by the one or more pieces of crowd-sourced information of step 201. The one or more geographic areas may for instance be divided into one or more smaller (e.g. geographic) areas, e.g. based on a pre-defined size of an (e.g. geographic) area a respective tile should cover, e.g. 100 m×100 m, to name but a few non-limiting examples. The result of the determining, e.g. the one or more respective tiles of the set of tiles, or the set of tiles, may for instance be stored, e.g. in a memory (e.g. database 120 of FIG. 1).

In an optional third step 203, one tile of the set of tiles is selected. The selected tile is used to perform and/or control at least some of the following steps 204 to 211 performed and/or controlled by the flowchart 200. As is indicated by the arrow pointing from step 209 back to step 203, the flowchart 200 may for instance perform and/or control at least some of the steps 204 to 208 with one or more (e.g. all) tiles of the set of tiles. Thus, the steps 204 to 208 may for instance be performed and/or controlled for a plurality of tiles. For instance, tile-by-tile, e.g. by selecting one tile after another of the set of tiles in the step 203, all tiles of the set of tiles may for instance be processed.

In an optional fourth step 204, a feature information respectively a feature vector is determined, e.g. for the selected tile of step 203. The feature information may for instance be determined based on the one or more pieces of fingerprint information. In case optional step 204 is performed and/or controlled, the area type and/or context information (see step 206) may for instance be determined further based on the feature information.

In a fifth step 205, one or more pieces of fingerprint information are obtained, e.g. for the selected tile of step 203. The one or more pieces of fingerprint information may for instance be obtained by retrieving the one or more pieces of fingerprint information out of the one or more pieces of crowd-sourced information of step 201. For instance, the one or more pieces of fingerprint information that are obtained may for instance be comprised or represented by the one or more pieces of crowd-sourced information of step 201. At least partially based on the respective tile of the set of tiles selected in step 203, out of all pieces of fingerprint information comprised or represented by the one or more pieces of crowd-sourced information, the respective one or more pieces of fingerprint information are obtained (e.g. retrieved) which were gathered at one or more locations located within the respective area of the selected tile.

In a sixth step 206, an area and/or context information is determined. The area and/or context information may for instance be indicative of a respective type and/or context of one or more venues and/or areas located within the area of the selected tile, e.g. a shopping mall, office building, airport, stations, urban outdoor area, rural area, or the like, to name but a few non-limiting examples.

In an optional seventh step 207, a priority information is determined. The priority information may for instance be indicative of whether or not a gathering of further (e.g. new and/or updated) pieces of fingerprint information and/or crowd-sourced information is needed, e.g. since available pieces of such information may for instance be outdated. Then, in optional step 208, the determined priority information of step 207 may for instance be associated with the respective tile, e.g. selected in step 203, and/or with the respective area covered by the respective tile of the set of tiles, e.g. selected in step 203.

In an optional step 209, it is checked whether or not all tiles of the respective set of tiles were processed. In case further one or more tiles of the set of tiles should be processed, e.g. by performing and/or controlling at least some of the steps 204 to 208, the flowchart 200 may for instance continue with performing and/or controlling step 203. In case all of the tiles comprised or represented by the set of tiles determined in step 202 are processed, the flowchart 200 may for instance continue with performing and/or controlling the optional step 210. Alternative, flowchart 200 may for instance not be further executed.

In an optional tenth step 210, the priority information (step 207) and/or the association (step 208) may for instance be provided, e.g. by outputting the respective priority information and/or association to one or more mobile devices (e.g. mobile device(s) 130 of FIG. 1). The respective priority information and/or association may for instance be provided so that the respective mobile device(s) may for instance gather (e.g. further) pieces of fingerprint information and/or crowd-sourced information in response to being provided with the respective priority information and/or association. Upon being provided with the respective priority information and/or association, e.g. the respective mobile device(s) may for instance perform and/or control the flowchart 300 of FIG. 3.

In an optional step 211, in response to the providing of the respective priority information and/or association, e.g. to mobile device(s) 130 of FIG. 1, one or more pieces of crowd-sourced information are obtained, e.g. by receiving the one or more pieces of crowd-sourced information, e.g. from mobile device(s) 130 of FIG. 1 as a result to providing the respective mobile device(s) the respective priority information and/or association in optional step 211.

Figure 3:
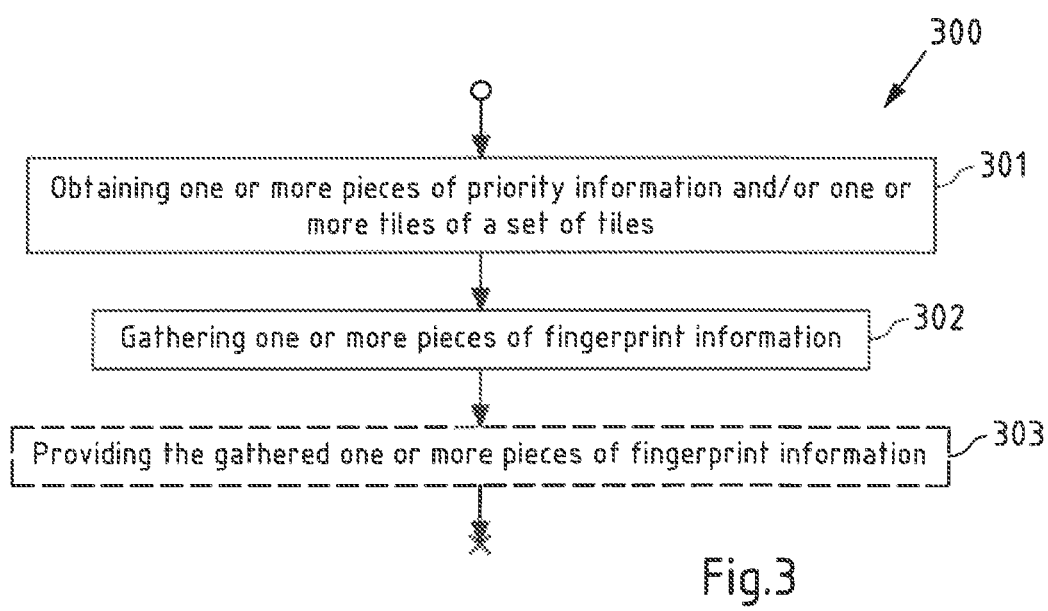
FIG. 3 a flowchart showing an example embodiment of a method according to the second exemplary aspect of the present invention.

FIG. 3 is a flowchart 300 showing an example embodiment of a method according to the second exemplary aspect of the present invention. This flowchart 300 may for instance be performed by a mobile device, e.g. mobile device 130 of FIG. 1. This flowchart 300 may for instance be performed and/or controlled by apparatus 500 of FIG. 5.

In a first step 301, one or more pieces of priority information are obtained. Additionally or alternatively, one or more tiles of a set of tiles are obtained. The obtaining may for instance be a receiving of the one or more pieces of priority information and/or of the one or more tiles of the set of tiles, e.g. from a server or server cloud, e.g. server 110 of FIG. 1. In case one or more tiles are obtained (e.g. received) such one or more tiles may for instance comprise one or more pieces of priority information.

In a second step 302, one or more pieces of fingerprint information are gathered (e.g. measured). The gathering of the one or more pieces of fingerprint information may for instance be performed and/or controlled by a communication interface (e.g. communication interface(s) 550 of FIG. 5, in case flowchart 300 is performed and/or controlled by apparatus 500 of FIG. 5), and/or by one or more sensors (e.g. sensors 570 of FIG. 5, in case flowchart 300 is performed and/or controlled by apparatus 500 of FIG. 5). The gathering of the one or more pieces of fingerprint information may for instance be performed and/or controlled at least partially based on the obtained one or more pieces of priority information and/or of the one or more tiles of the set of tiles, enabling the mobile device (e.g. apparatus 500 of FIG. 5) performing and/or controlling the flowchart 300 to gather the one or more pieces of fingerprint information in respective areas as indicated by the obtained one or more pieces of priority information and/or of the one or more tiles of the set of tiles of step 301.

In an optional third step 303, the gathered one or more pieces of fingerprint information are provided, e.g. to a server or server cloud from which the one or more pieces of priority information and/or of the one or more tiles of the set of tiles of step 301 are obtained. Such a server or server cloud may for instance be the server 110 of FIG. 1. The one or more pieces of fingerprint information may for instance be provided, e.g. by outputting (e.g. sending) the one or more pieces of fingerprint information. Alternatively, the one or more pieces of fingerprint information may for instance be provided, e.g. by forming one or more pieces of crowd-sourced information out of the gathered one or more pieces of fingerprint information. Then, these one or more pieces of crowd-sourced information may for instance be provided, e.g. to the server or server cloud as mentioned above.

Figure 4:
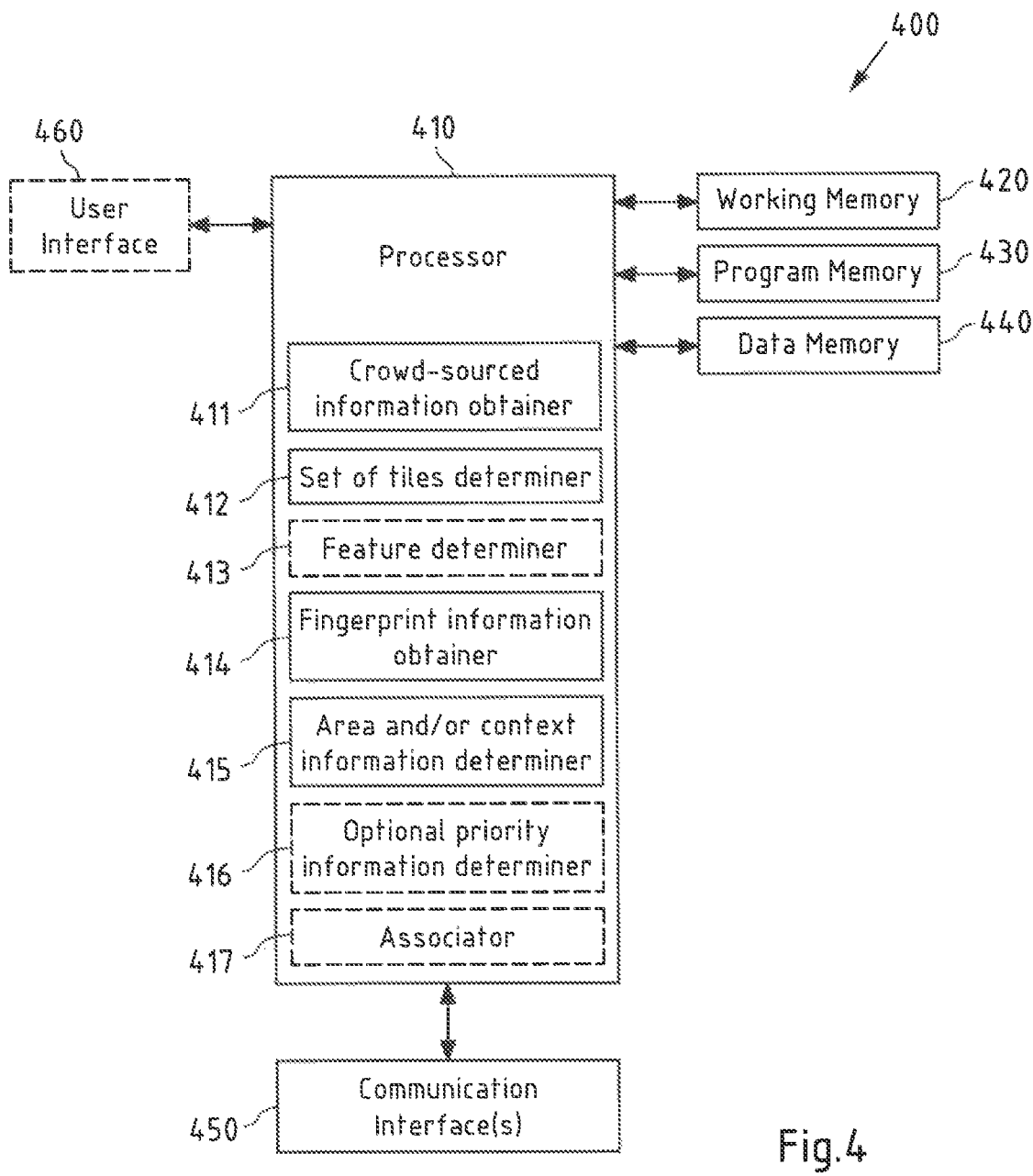
FIG. 4 a schematic block diagram of an apparatus configured to perform the method according to the first exemplary aspect of the present invention.

FIG. 4 is a schematic block diagram of an apparatus 400 according to an exemplary aspect of the present invention, which may for instance represent the server 110 of FIG. 1.

Apparatus 400 comprises a processor 410, working memory 420, program memory 430, data memory 440, communication interface(s) 450, and an optional user interface 460.

Apparatus 400 may for instance be configured to perform and/or control or comprise respective means (at least one of 410 to 460) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise a crowd-sourced information obtainer 411 as a functional and/or structural unit. Crowd-sourced information obtainer 411 may for instance be configured to obtain one or more pieces of crowd-sourced information (see step 201 of FIG. 2, and/or step 211 of FIG. 2).

Processor 410 may for instance comprise a set of tiles determiner 412 as a functional and/or structural unit. Set of tiles determiner 412 may for instance be configured to determine a set of tiles (see step 202 of FIG. 2).

Processor 410 may for instance comprise an optional feature determiner 413 as a functional and/or structural unit. Optional feature determiner 413 may for instance be configured to determine one or more pieces of feature information (see step 204 of FIG. 2).

Processor 410 may for instance comprise a fingerprint information obtainer 414 as a functional and/or structural unit. Fingerprint information obtainer 414 may for instance be configured to obtain one or more pieces of fingerprint information (see step 205 of FIG. 2).

Processor 410 may for instance comprise an area and/or context information determiner 415 as a functional and/or structural unit. Area and/or context information determiner 415 may for instance be configured to determine one or more pieces of area and/or context information (see step 206 of FIG. 2).

Processor 410 may for instance comprise an optional priority information determiner 416 as a functional and/or structural unit. Optional priority information determiner 416 may for instance be configured to determine one or more pieces of priority information (see step 207 of FIG. 2).

Processor 410 may for instance comprise an optional associator 417 as a functional and/or structural unit. Optional associator 417 may for instance be configured to associate one or more pieces of priority information with one or more tiles of the set of tiles (see step 208 of FIG. 2).

Processor 410 may for instance further control the memories 420 to 440, the communication interface(s) 450, and the optional user interface 460.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of crowd-sourced information, one or more tiles, one or more sets of tiles, one or more pieces of feature information, one or more pieces of fingerprint information, one or more pieces of area and/or context information, one or more pieces of priority information, one or more radio maps, or a combination thereof, to name but a few non-limiting examples.

Communication interface(s) 450 enable apparatus 400 to communicate with other entities, e.g. with one or more mobile device 130 of FIG. 1, and/or with one or more radio nodes 140 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

Figure 5:
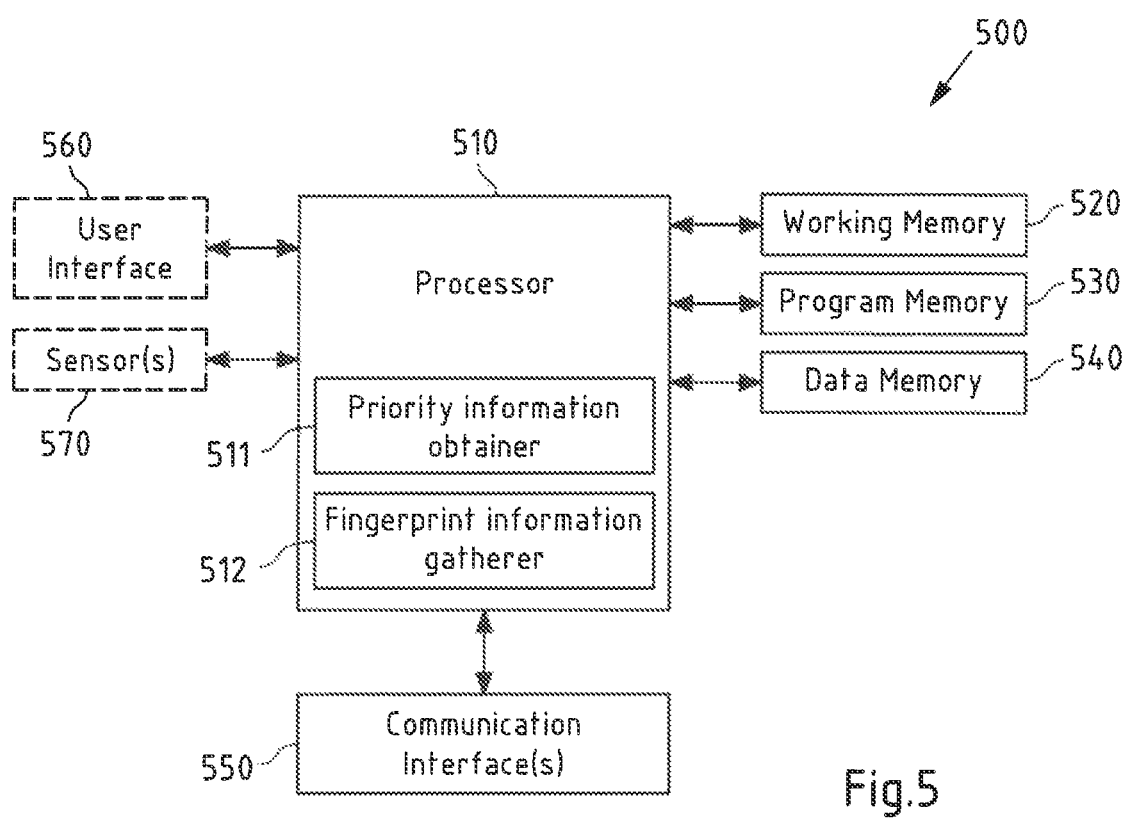
FIG. 5 a schematic block diagram of an apparatus configured to perform the method according to the second exemplary aspect of the present invention.

FIG. 5 is a schematic block diagram of an apparatus 500 according to an exemplary aspect of the present invention, which may for instance represent the mobile device 130 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the second exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspect of the invention of the present invention.

Processor 510 may for instance comprise a priority information obtainer 511 as a functional and/or structural unit. Priority information obtainer 511 may for instance be configured to obtain one or more pieces of priority information (see step 301 of FIG. 3).

Processor 510 may for instance comprise a fingerprint information gatherer 512 as a functional and/or structural unit. Fingerprint information gatherer 512 may for instance be configured to gather one or more pieces of fingerprint information (see step 302 of FIG. 3). Additionally or alternatively, one or more pieces of fingerprint information may for instance be gathered by the communication interface(s) 550, e.g. by measuring one or more signal strength values and/or one or more identifiers of observable radio nodes at a current location of apparatus 500.

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Data memory 540 may for instance store one or more pieces of crowd-sourced information, one or more tiles, one or more sets of tiles, one or more pieces of feature information, one or more pieces of fingerprint information, one or more pieces of area and/or context information, one or more pieces of priority information, one or more radio maps, or a combination thereof, to name but a few non-limiting examples.

Communication interface(s) 550 enable apparatus 500 to communicate with other entities, e.g. with server 110 of FIG. 1, and/or with one or more radio nodes 140 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a GNSS-based sensor (e.g. a GPS sensor), a barometric sensor, e.g. to gather pressure and/or altitude information, an accelerometer, a gyroscope, or a combination thereof, to name but a few non-limiting examples.

Some or all of the components of the apparatus 500 may for instance be connected via a bus. Some or all of the components of the apparatus 500 may for instance be combined into one or more modules.

The following embodiments shall also be considered to be disclosed:

Embodiment 1

An apparatus (e.g. a server or server cloud) comprising at least one processor and at least one memory including computer program code, the at least one memory and the computer program code configured to, with the at least one processor, cause the apparatus to at least perform:
obtaining one or more pieces of crowd-sourced information, wherein a respective crowd-sourced information of the one or more pieces of crowd-sourced information is at least indicative of a location at which the respective crowd-sourced information was gathered;
determining a set of tiles, wherein the set of tiles is determined at least partially based on the one or more geographical areas, wherein the one or more geographical areas are divided into one or more smaller areas of a pre-defined size, wherein a respective tile of the set of tiles represents a respective smaller area of the one or more smaller areas; and
for at least one tile of the set of tiles:
obtaining one or more pieces of fingerprint information comprised by the one or more pieces of crowd-sourced information, wherein the one or more pieces of fingerprint information were gathered within the respective area of the respective tile; and
determining an area type and/or context information indicative of a type of venue located within the respective tile and/or context the respective area of the respective tile is used for, wherein the area type and/or context information is determined at least partially based on the one or more pieces of fingerprint information.

Embodiment 2

The apparatus according to embodiment 1, the at least one memory and the computer program code configured to, with the at least one processor, cause the apparatus further to perform:
determining a feature information indicative of one or more feature values for the respective area of the respective tile, wherein the feature information is determined based on the one or more pieces of fingerprint information, and the area type and/or context information is determined further based on the feature information.

Embodiment 3

The apparatus according to embodiment 1 or embodiment 2, the at least one memory and the computer program code configured to, with the at least one processor, cause the apparatus further to perform:
determining a priority information indicative of a crowd-sourcing priority value for the respective area of the respective tile, wherein the priority information is determined at least partially based on the area type and/or context information; and
associating the respective tile of the set of tiles with the determined priority information.

Embodiment 4

The apparatus according to embodiment 3, wherein the priority information is determined to comprise or represent a default value in case the respective area of the respective tile lacks a sufficient amount of pieces of fingerprint information obtainable to enable determining of the area type and/or context information.

Embodiment 5

The apparatus according to any of the preceding embodiments, wherein the area type and/or context information is determined by a machine learning network.

Embodiment 6

The apparatus according to embodiment 5, further comprising:
  determining one or more parameters of the machine learning network at least partially based on one or more pieces of fingerprint information comprised or represented by the one or more pieces of crowd-sourced information, wherein the one or more parameters are indicative of one or more adaptive variables used by the machine learning network to determine an output, and wherein the output represents an area type and/or context information.

Embodiment 7

The apparatus according to embodiment 5 or embodiment 6, wherein the machine learning network that determines the area type and/or context information is a supervised machine learning network.

Embodiment 8

The apparatus according to any of the embodiments 3 to 7, wherein the crowd-sourcing priority represents whether or not further gathering one or more pieces of fingerprint information for the respective geographic area of the tile is needed or not.

Embodiment 9

The apparatus according to any of the embodiments 3 to 8, the at least one memory and the computer program code configured to, with the at least one processor, cause the apparatus further to perform:
  providing the respective priority information and/or the respective tile of the set of tiles associated with the respective priority information.

Embodiment 10

The apparatus according to embodiment 9, the at least one memory and the computer program code configured to, with the at least one processor, cause the apparatus further to perform:
  obtaining one or more pieces of crowd-sourced information in response to at least one provided priority information and/or respective tile of the set of tiles associated with the respective priority information, wherein said obtained one or more pieces of crowd-sourced information were gathered in one or more respective areas of the one or more respective tiles with which the at least one provided priority information is associated.

Embodiment 11

The apparatus according to any of the preceding embodiments, wherein each piece of the one or more pieces of fingerprint information comprises or represents one or more of the following:

a reference position at which a respective crowd-sourced information was gathered;
  one or more identifiers of one or more radio nodes which sent one or more signals were observable at the position at which a respective crowd-sourced information was gathered; and
  one or more received signal strength values, wherein the one or more received signal strength values were gathered based on one or more signals sent by one or more radio nodes, which sent one or more signals of the one or more radio nodes were observable at the position at which a respective crowd-sourced information was gathered.

Embodiment 12

An apparatus (e.g. a mobile device) comprising at least one processor and at least one memory including computer program code, the at least one memory and the computer program code configured to, with the at least one processor, cause the apparatus to at least perform:
  obtaining one or more pieces of priority information and/or one or more tiles of a set of tiles, wherein the one or more tiles of the set of tiles are associated with a respective priority information of the one or more pieces of priority information, wherein the set of tiles is indicative of one or more geographical areas that are divided into one or more smaller areas of a pre-defined size, wherein a respective tile of the set of tiles represents a respective smaller area of the one or more smaller areas; and
  gathering one or more pieces of fingerprint information at least partially based on the obtained one or more pieces of priority information.

Embodiment 13

The apparatus according to embodiment 12, the at least one memory and the computer program code configured to, with the at least one processor, cause the apparatus further to perform:
  providing the gathered one or more pieces of fingerprint information.

Embodiment 14

The apparatus according to embodiment 12 or embodiment 13, wherein the one or more pieces of fingerprint information are gathered in case the at least one mobile device is located within a respective geographic area of a tile of the one or more tiles with which at least one priority information of the one or more pieces of priority information is associated with.

Embodiment 15

The apparatus according to any of the embodiments 12 to 14, wherein the one or more pieces of fingerprint information are gathered in case one or more further requirements are met, wherein the one or more further requirements are indicative of available resources of the at least one mobile device.

Embodiment 16

The apparatus according to any of the embodiments 12 to 15, further comprising:
  determining whether or not the one or more pieces of fingerprint information are gathered prior to the gathering of the one or more pieces of fingerprint information, wherein a comparison of a respective priority information of a respective tile and a pseudo-random number is performed and/or controlled, so that the gathering of one or more pieces of fingerprint information is more likely in case a respective priority information represents a high priority than in case the respective priority information represents a low priority.

Embodiment 17

An apparatus comprising at least one processor and at least one memory including computer program code, the at least one memory and the computer program code configured to, with the at least one processor, cause an apparatus at least to perform and/or control the method of any of the embodiments 1 to 11.

Embodiment 18

An apparatus comprising at least one processor and at least one memory including computer program code, the at least one memory and the computer program code configured to, with the at least one processor, cause an apparatus at least to perform and/or control the method of any of the embodiments 12 to 16.

Embodiment 19

A tangible computer-readable medium storing computer program code, the computer program code when executed by a processor causing an apparatus to perform and/or control:
  obtaining one or more pieces of crowd-sourced information, wherein a respective crowd-sourced information of the one or more pieces of crowd-sourced information is at least indicative of a location at which the respective crowd-sourced information was gathered;
  determining a set of tiles, wherein the set of tiles is determined at least partially based on the one or more geographical areas, wherein the one or more geographical areas are divided into one or more smaller areas of a pre-defined size, wherein a respective tile of the set of tiles represents a respective smaller area of the one or more smaller areas; and
  for at least one tile of the set of tiles:
  obtaining one or more pieces of fingerprint information comprised by the one or more pieces of crowd-sourced information, wherein the one or more pieces of fingerprint information were gathered within the respective area of the respective tile; and
  determining an area type and/or context information indicative of a type of venue located within the respective tile and/or context the respective area of the respective tile is used for, wherein the area type and/or context information is determined at least partially based on the one or more pieces of fingerprint information.

Embodiment 20

A tangible computer-readable medium storing computer program code, the computer program code when executed by a processor causing an apparatus to perform and/or control:
  obtaining one or more pieces of priority information and/or one or more tiles of a set of tiles, wherein the one or more tiles of the set of tiles are associated with a respective priority information of the one or more pieces of priority information, wherein the set of tiles is indicative of one or more geographical areas that are divided into one or more smaller areas of a pre-defined size, wherein a respective tile of the set of tiles represents a respective smaller area of the one or more smaller areas; and
  gathering one or more pieces of fingerprint information at least partially based on the obtained one or more pieces of priority information.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
   obtaining one or more pieces of crowd-sourced information, wherein a respective crowd-sourced information of the one or more pieces of crowd-sourced information is at least indicative of a location at which the respective crowd-sourced information was gathered;
   determining a set of tiles, wherein the set of tiles is determined at least partially based on the one or more geographical areas, wherein the one or more geographical areas are divided into one or more smaller areas of a pre-defined size, wherein a respective tile of the set of tiles represents a respective smaller area of the one or more smaller areas; and
   the method further comprises for at least one tile of the set of tiles:
   obtaining one or more pieces of fingerprint information comprised by the one or more pieces of crowd-sourced information, wherein the one or more pieces of fingerprint information were gathered within the respective area of the respective tile and at least one piece of fingerprint information of the one or more pieces of fingerprint information comprises information characterizing observation of at least one radio node by a respective apparatus that generated the at least one piece of fingerprint information; and
   processing the one or more pieces of fingerprint information to determine an area type and/or context information indicative of a type of venue located within the respective tile and/or a context indicative of a use of the respective area of the respective tile based at least in part on the information characterizing the observation of the at least one radio node.

2. The method according to claim 1, further comprising:
   determining a feature information indicative of one or more feature values for the respective area of the respective tile, wherein the feature information is determined based on the one or more pieces of fingerprint information, and the area type and/or context information is determined further based on the feature information.

3. The method according to claim 2, wherein the feature information is an aggregated representation of the one or more pieces of fingerprint information.

4. The method according to claim 1, further comprising:
   determining a priority information indicative of a crowd-sourcing priority value for the respective area of the respective tile, wherein the priority information is determined at least partially based on the area type and/or context information; and
   associating the respective tile of the set of tiles with the determined priority information.

5. The method according to claim 4, wherein the crowd-sourcing priority represents whether or not further gathering one or more pieces of fingerprint information for the respective geographic area of the tile is needed or not.

6. The method according to claim 4, further comprising:
   providing the respective priority information and/or the respective tile of the set of tiles associated with the respective priority information.

7. The method according to claim 6, further comprising:
   obtaining one or more pieces of crowd-sourced information in response to at least one provided priority information and/or respective tile of the set of tiles associated with the respective priority information, wherein said obtained one or more pieces of crowd-sourced information were gathered in one or more respective areas of the one or more respective tiles with which the at least one provided priority information is associated.

8. The method according to claim 1, wherein the area type and/or context information is determined by a machine learning network, and wherein the method further comprises:
   determining one or more parameters of the machine learning network based at least in part on one or more pieces of fingerprint information comprised or represented by the one or more pieces of crowd-sourced information, wherein the one or more parameters are indicative of one or more adaptive variables used by the machine learning network to determine an output, and wherein the output represents an area type and/or context information.

9. The method according to claim 1, wherein each piece of the one or more pieces of fingerprint information comprises or represents one or more of the following:
   a reference position at which a respective crowd-sourced information was gathered;
   one or more identifiers of one or more radio nodes which sent one or more signals that were observable at the position at which a respective crowd-sourced information was gathered; and
   one or more received signal strength values, wherein the one or more received signal strength values were gathered based on one or more signals sent by one or more radio nodes, which sent one or more signals of the one or more radio nodes that were observable at the position at which a respective crowd-sourced information was gathered.

10. A method, performed by at least one mobile device, comprising:
    obtaining one or more pieces of priority information and/or one or more tiles of a set of tiles, wherein the one or more tiles of the set of tiles are associated with a respective priority information of the one or more pieces of priority information, wherein the set of tiles is indicative of one or more geographical areas that are divided into one or more smaller areas of a pre-defined size, wherein a respective tile of the set of tiles represents a respective smaller area of the one or more smaller areas;
    prior to gathering one or more pieces of fingerprint information, determining whether or not the one or more pieces of fingerprint information are to be gathered, wherein a comparison of a respective priority information of a respective tile and a pseudo-random number is performed and/or controlled, so that the gathering of one or more pieces of fingerprint information is more likely in case a respective priority information represents a high priority than in case the respective priority information represents a low priority; and gathering one or more pieces of fingerprint information at least partially based on the obtained one or more pieces of priority information.

11. The method according to claim 10, further comprising:

providing the gathered one or more pieces of fingerprint information.

12. The method according to claim 10, wherein the one or more pieces of fingerprint information are gathered in case the at least one mobile device is located within a respective geographic area of a tile of the one or more tiles with which at least one priority information of the one or more pieces of priority information is associated with.

13. The method according to claim 10, wherein the one or more pieces of fingerprint information are gathered in case one or more further requirements are met, wherein the one or more further requirements are indicative of available resources of the at least one mobile device.

14. An apparatus comprising at least one processor and at least one memory including computer program code, the at least one memory and the computer program code configured to, with the at least one processor, cause an apparatus at least to:

obtain one or more pieces of crowd-sourced information, wherein a respective crowd-sourced information of the one or more pieces of crowd-sourced information is at least indicative of a location at which the respective crowd-sourced information was gathered;

determine a set of tiles, wherein the set of tiles is determined at least partially based on the one or more geographical areas, wherein the one or more geographical areas are divided into one or more smaller areas of a pre-defined size, wherein a respective tile of the set of tiles represents a respective smaller area of the one or more smaller areas; and for at least one tile of the set of tiles:

obtain one or more pieces of fingerprint information comprised by the one or more pieces of crowd-sourced information, wherein the one or more pieces of fingerprint information were gathered within the respective area of the respective tile and at least one piece of fingerprint information of the one or more pieces of fingerprint information comprises information characterizing observation of at least one radio node by a respective apparatus that generated the at least one piece of fingerprint information; and process the one or more pieces of fingerprint information to determine an area type and/or context information indicative of a type of venue located within the respective tile and/or a context indicative of a use of the respective area of the respective tile based at least in part on the information characterizing the observation of the at least one radio node.

15. The apparatus according to claim 14, wherein the at least one memory and the computer program code are further configured to, with the at least one processor, cause an apparatus to:

determine a feature information indicative of one or more feature values for the respective area of the respective tile, wherein the feature information is determined based on the one or more pieces of fingerprint information, and the area type and/or context information is determined further based on the feature information.

16. The apparatus according to claim 14, wherein the at least one memory and the computer program code are further configured to, with the at least one processor, cause an apparatus to:

determine a priority information indicative of a crowd-sourcing priority value for the respective area of the respective tile, wherein the priority information is determined at least partially based on the area type and/or context information; and associate the respective tile of the set of tiles with the determined priority information.

17. The apparatus according to claim 16, wherein the at least one memory and the computer program code are further configured to, with the at least one processor, cause an apparatus to:

provide the respective priority information and/or the respective tile of the set of tiles associated with the respective priority information.

18. The apparatus according to claim 17, wherein the at least one memory and the computer program code are further configured to, with the at least one processor, cause an apparatus to:

obtain one or more pieces of crowd-sourced information in response to at least one provided priority information and/or respective tile of the set of tiles associated with the respective priority information, wherein said obtained one or more pieces of crowd-sourced information were gathered in one or more respective areas of the one or more respective tiles with which the at least one provided priority information is associated.

19. The apparatus according to claim 14, wherein the area type and/or context information is determined by a machine learning network, and wherein the at least one memory and the computer program code are further configured to, with the at least one processor, cause an apparatus to:

determine one or more parameters of the machine learning network based at least in part on one or more pieces of fingerprint information comprised or represented by the one or more pieces of crowd-sourced information, wherein the one or more parameters are indicative of one or more adaptive variables used by the machine learning network to determine an output, and wherein the output represents an area type and/or context information.

20. The apparatus according to claim 14, wherein each piece of the one or more pieces of fingerprint information comprises or represents one or more of the following:

a reference position at which a respective crowd-sourced information was gathered;

one or more identifiers of one or more radio nodes which sent one or more signals that were observable at the position at which a respective crowd-sourced information was gathered; and one or more received signal strength values, wherein the one or more received signal strength values were gathered based on one or more signals sent by one or more radio nodes, which sent one or more signals of the one or more radio nodes that were observable at the position at which a respective crowd-sourced information was gathered.

* * * * *